United States Patent Office 3,253,869
Patented May 31, 1966

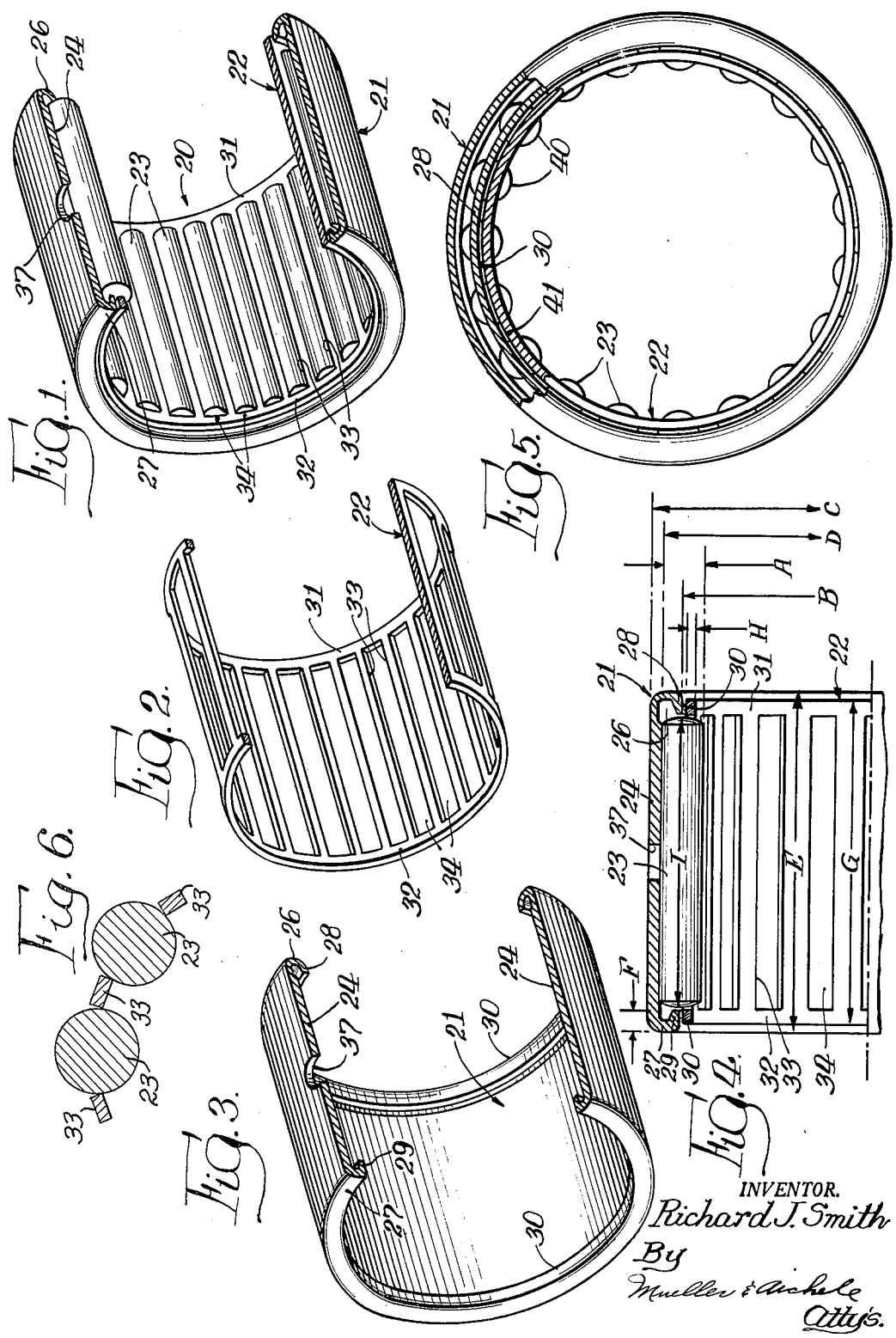

3,253,869
DRAWN SHELL ROLLER BEARING
Richard J. Smith, Valparaiso, Ind., assignor to McGill Manufacturing Company, Inc., Valparaiso, Ind., a corporation of Indiana
Continuation of application Ser. No. 143,405, Oct. 6, 1961. This application Jan. 22, 1964, Ser. No. 341,478
2 Claims. (Cl. 308—212)

This application is a continuation of my application Serial No. 143,405, filed October 6, 1961.

This invention relates generally to roller bearing assemblies. In particular, the invention is directed to a roller bearing assembly having a drawn shell as the race ring or housing, and a stamped retainer or cage in which the rollers are maintained in guided position in the housing. The retainer and the shell are positioned relative to each other in the complete assembly in a so-called land riding relationship so that in operation of the bearing all end thrust exerted by the rollers is taken by a formed lip on the shell and the retainer rides on the annular surface of each of the lips.

Drawn shell roller bearings are well known in the art and are recognized for their low manufacturing cost as compared to roller bearings which have a race structure fabricated by a machining process. A drawn shell is typically fabricated by a process in which a sheet metal blank is drawn into a cup-like shape by a punching operation which is ordinarily performed in a punch press or eyelet press. The inside and the outside of the shell are very smooth as a result of the drawing process, and consequently the final shell housing with lips can be formed simply and economically without additional costly machining. Another advantage of the drawn type of shell is that it is very thin and therefore considerably lighter in weight than a machined shell, and this weight advantage is quite desirable, for instance, in aircraft installations which represent a major application for roller bearings.

For applications in which a precision roller bearing is required, a retainer type roller bearing construction is sometimes preferable to full complement types because the rollers are guided by the retainer, and skewing of the rollers is at a minimum. The retainer cage employed in prior drawn shell roller bearings used commercially has generally been of the shaft riding type in which a portion of the cage rides on the shaft to which the bearing assembly is applied. This causes some lubrication problems, because the portions of the cage which ride on the shaft tend to wipe lubricant material from the shaft ahead of the rollers, and this interferes with proper lubrication of the rollers, and tends to reduce the effective life of the bearing.

The fabrication of prior commercially employed drawn shell roller bearings of the retainer type has been hampered by some of the design characteristics of the bearing itself. For instance, the retainer cage has been confined at its sides within trough-like turned over walls at the sides of the shell, and this has made it necessary to assemble the retainer into the shell before the shell is completely formed into its condition for use. As a practical matter, the shell in such prior devices cannot be hardened before the walls are bent into their final shape. If the entire shell and the retainer cage assembly are each hardened, the life of the bearing may be reduced because a hardened retainer can cause wear of the rollers or of the drawn shell or race ring. When the drawn shell or housing and the rollers wear, then there is danger that the life of the bearing will be substantially reduced.

It is one object of the present invention to provide a retainer-type drawn shell roller bearing of a construction such that the drawn shell housing may be formed to its final shape and then hardened before it is assembled with a retainer cage and rollers. This provides a shell or housing at a low cost but with a long life expectancy in the final assembled bearing.

Another object of the invention is to provide in a roller bearing a drawn shell adapted to have a retainer for the rollers in land riding relation therewith during operation of the bearing so that the end thrust of the rollers can be taken up by the drawn shell or housing.

Another object of the invention is to provide a roller bearing assembly with an inexpensive drawn shell housing and a construction which affords the maximum in effective roll or length, and such a shell housing in combination with a stamped sheet metal retainer that the final assembly will provide for more rollers and therefore greater load capacity for a bearing of a given size than drawn shell bearing constructions which are presently available.

A feature of the present invention is the provision of a low cost roller bearing assembly in which a relatively thin retainer cage is positioned and maintaied in land riding relation on cylindrical annular faces of inwardly turned lips formed at the sides of a drawn shell housing, and in which the roller members are guided by the retainer cage. In fact, the retainer cage performs no other function in the bearing. With this construction the retainer cannot bind or become jammed in the housing and yet the rollers are properly retained for precision roller bearing action.

Another feature of this invention is the provision of a retainer type roller bearing assembly with a drawn shell wherein the retainer is separable from the drawn shell or housing, and the rollers are assembled in the retainer in its separable position in the housing. Because of this relationship, the shell is hardened in completed condition before the assembly of the retainer and rollers therein. An inexpensive stamped or formed and welded retainer is used, and this is of thin stock and need not be hardened. This construction and positioning of the parts permits a larger number of rollers to be used in the housing than in the prior commercial bearings with drawn shells and provides an exceedingly low cost but quality unit.

The invention is illustrated in the accompanying drawings in which:

FIG. 1 is a perspective view, with a scale about one and one-half times actual size, of one size of a retainer type roller bearing assembly in accordance with the invention, with a portion of the assembly being cut away to show the relation between the shell housing, the retainer cage, and the rollers;

FIG. 2 is a perspective view of the retainer cage of the bearing assembly of FIG. 1;

FIG. 3 is a perspective view of the drawn shell housing of the bearing assembly of FIG. 1;

FIG. 4 is a fragmentary cross-sectional view, drawn to a scale about twice the actual size of a bearing as is illustrated in the assembly of FIG. 1, and FIG. 4 shows in particular the manner in which the retainer cage stands in land riding relationship on the inner periphery of the turned-in lips formed at the sides of the shell;

FIG. 5 is a side view of the same scale as FIG. 4. A portion is shown in section to illustrate the radial relationship of the parts; and FIG. 6 is an enlarged cross-sectional illustration of the manner in which a roller cooperates with the retention cage.

Referring now to the drawings, there is shown a roller bearing assembly 20 which consists of a shell housing 21, a retainer cage 22 which fits inside the housing, and a complement of elongated rollers 23 which are retained in a raceway between the axial ends or sides of the housing. The configuration of the shell housing 21 may be seen in FIGS. 1, 3 and 4, and is perhaps best illustrated in FIG. 3. The shell is a one-piece metal member or race ring, and has a central raceway portion 24 which has a smooth and highly polished inner periphery of cylindrical shape on which the rollers 23 are received in the complete assembly. At the axial ends or sides of the raceway portion 24 there are inwardly bent radially extending flanges or shoulders 26 and 27, and the free ends of these flanges are bent axially inward to form lips 28 and 29. The flanges with their inwardly bent lips have a trough-like configuration. On the inner face of each of the lips 28 and 29 there is an annular surface 30 which extends parallel to the bearing axis, and it is on these surfaces 30 that the retainer cage 23 rides during operation of the complete bearing. The raceway portion 24 typically is about .030 inch thick an embodiment of the invention. The lips 28 and 29 are slightly thinner than the raceway portion of the shell due to deformation in the forming of the lips. The lips define between their free ends the axial limits of the raceway in which the rollers lie in the complete assembly.

The retainer cage 22 (see FIG. 2) has circular rim portions 31 and 32 at its axial ends or sides, and there are cross bars 33 extending between these rims forming windows or pockets 34 in which the rollers 23 are received in the complete bearing assembly as shown in FIG. 1. The retainer is fabricated from strip steel, and the pockets are stamped out with the stock in flat strip form. It is then formed into a cylindrical shape, and the free ends of the formed piece welded together. The outer peripheral surface of the rim portions 31 and 32 has a loose fit with the annular surface 30 on the interior of the lips 28 and 29 of the shell, and thus the retainer cage in the complete bearing assembly is free to rotate with respect to the shell and also to move axially with respect to the shell.

The axial movement or play of the retainer cage 22 in the complete assembly is limited by the rollers 23 and not by the shell housing, and thus there is no chance for the retainer cage to become jammed or to cause jamming of the rollers due to binding of the cage. The rollers 23 are guided by the cross bars or ribs 33 of the cage, but they are retained axially by the free ends on the lips 28 and 29 of the shell housing 21. In fact the retainer serves a guiding function only for the rollers and can be of a steel which is easily stamped, formed, and welded, and need not be hardened.

The manner in which the rollers 23 are confined between the flanges or shoulders of the shell and the relative positions and dimensions of the parts necessary to accomplish this will be explained with reference to FIGS. 4 and 5. In FIG. 4, one roller 23 is shown in the position it takes when the bearing is applied to a shaft such that the shaft presses the roller against the inner periphery or raceway of the shell housing. The other rollers are omitted in FIG. 4 for the sake of clarity of illustration. All of the rollers 23 are shown in FIG. 5, and they are shown in position against the raceway surface. It may be noted in FIG. 4 that the rollers have rounded end portions 36 positioned opposite the free ends of the lips 28 and 29. The free end of each lip is generally parallel to a tangent at the center of the roller end, but there may be some departure from this relation due to deformation of the metal in forming the lips. When the roller is centered within the raceway, as shown in FIG. 4, there is a small clearance between each end portion of the roller and the corresponding free end of the lip portion of the shell. Thus, the roller is free to rotate within the raceway for proper bearing action. If axial thrust is applied to the roller 23, that is, force having a component acting in the direction of the axis of the roller, the roller would move in the direction of the force until it abuts against one of the lip portions 28 and 29. The free end of each lip is positioned so that it will engage the roller adjacent to the pitch circle of the rollers. With this arrangement, the axial retention of the rollers has no harmful effect on the rollers and does not cause undue wear of the rollers.

The rim portions 31 and 32 of the retainer cage are also positioned opposite the end portions of the roller and are engageable by the roller when endwise thrust or force is applied to it. However, if the cage is pushed in either axial direction by the roller, it is free to move and there is no structure in its way which can cause it to bind.

In order to have the retainer cage assume a proper land riding position when the bearing is in operation, it is necessary for the elements of the bearing assembly to have accurately controlled dimensions. For instance, the annular surface 30 on the inner periphery of the lips 28 and 29 should be spaced a distance from the inner surface of the raceway portion 24 of about 25% to 50% of the diameter of the rollers depending upon the size of the assembled bearing. If this formula is followed, the edges at the outer radial periphery of the cross bars of the cage will be in proper position to guide the rollers, and this has in general been found to be the most effective position for contact between the rollers and the bars of the retainer.

It may be seen that the annular surfaces 30 on the radial interior of the lips are in a position such that they will be spaced from a shaft to which the bearing is applied by a distance at least as great as the roller radius, and this spacing allows room for the rims of the cage to fit between the flanges and a shaft, with the rims clearing the shaft. As may be seen best in FIG. 5, the retainer 22 lies entirely within the radial limits defined by the lips 28, 29 and the inner periphery of the bearing formed by the rollers at 40. The pitch circle of the rollers is at 41, and the lips are on one side of the pitch circle and the retainer is on the other side of it, with an annular surface 30 being right at the pitch circle.

Another dimensional consideration is that the length of the lips 28 and 29 need only be sufficient to accommodate the axial width of the rim portions 31 and 32 of the retainer cage. These rim portions have a width up to about 1½ times as great as the thickness of the stock from which they are formed, and the retainer lips have a corresponding width. This makes the retainer lips rather short, and because of this the effective axial length of the rollers is quite great compared to the overall length of the bearing assembly. The length of the rollers is also a function of the spacing required between the rollers and the free ends of the lips 29 and 28, and since this spacing need only be a small clearance of the order of .005 inch minimum, the roller length is maximized.

Inasmuch as the retainer performs only a guiding function for the rollers and all thrust is taken up by the housing, it can be of thin stock and in the commercial embodiment of this invention, more rollers can be accommodated in the housing for a given size bearing than is possible with the prior art drawn shell roller riding bearings. In combination with the increased length of the rollers, the entire combination possible with the present invention increases the capacity over prior devices.

Table I below sets forth suitable dimensions in inches for a particular bearing such as is illustrated in FIG. 4. The dimensions for particular portions of the assembly are identified by capital letters at the left of the individual horizontal rows of the table, and these letters are applied to the corresponding structure in FIG. 4.

*Table I.—Bearing 20, FIG. 4*

| | |
|---|---|
| Roller diameter A | 5.32 |
| Lip bore B | 1.921 |
| Bearing outside diameter C | 2⅛ |
| Race bore D | 2.0657 |
| Bearing width E | 1½ |
| Lip width F | .080 |
| Cage width G | 1.442 |
| Cage thickness H | .042 |
| Roller length I | 1²¹⁄₆₄ |

The specifications for suitable materials for the shell, the retainer cage and the rollers of the bearing assembly, and special treatments for the materials are as follows.

Material:
   Cup _____ SAE 1000–1010 strip steel.
   Retainer ___. Same materials as cup, or various plastic materials.
   Rollers _____ SAE 50100–52100 steel or SAE 1080–1090 plain carbon steel.

Heat treatment:
   Cup _____ Cyanide or carbonitride harden approximately .010″ case depth, $R_c$ 60 minimum hardness.
   Roller _____. Through harden, $R_c$ 60 minimum hardness.

The bearing of the invention may be lubricated by oil or grease depending upon the requirements of the application in which the bearing is used. Oil is the preferred lubricant for most applications, and an oil hole 37 may be formed in the shell housing as shown in FIG. 1 for applications in which it is desired to lubricate the bearing while it is in service. When the bearing is in operation, there is a small, closely controlled clearance between the rollers 23 and the bars and rim portions of the retainer cage 22. Because of this clearance, the lubricating materials can circulate freely within the bearing. The inner axially extending surfaces of the retainer bars 33 which form walls of the pockets and confront the rollers are tapered in the radial direction so that the radially inner edges of the bars are closer together than the radially outer edges of the bars, as shown more clearly in FIG. 6. Because of this, the retention function of the retainer cage is separated from the guidance function, and the rollers are not contacted by the retention edges when the bearing is in operation. The spacing between the edges of the retainer crossbars at the inner surface of the retainer cage is closely controlled, and is such that the rollers may be snapped into place after the retainer cage has been inserted into the shell housing. Since the rollers do not contact these retention edges after the roller is applied to a shaft, the retention edges do not interfere with proper lubrication of the bearing.

It may be seen from the foregoing description that the roller bearing assembly of the invention has several significant advantages as compared to drawn shell bearing assemblies of the prior art. The fabrication and assembly of the bearing is greatly simplified since the shell housing can be supplied in its final form and condition of hardness before the retainer cage and rollers are inserted.

The retainer cage may be simply inserted into the housing with the housing in its final condition, and the rollers can then be snapped into place in the retainer.

As previously mentioned, the bearing assembly has some important advantages from an operational standpoint. The relative dimensions and positions of the rollers, the retainer cage and the shell are selected and controlled so that the shell is adapted to provide land riding operation of the cage. The retainer cage does not engage the shaft to which the bearing is applied. This avoids lubrication problems which are inherent in a shaft riding construction. Any axial thrust on the rollers is taken by the shoulders of the housing and not by the retainer cage, and because of this there is no chance for binding of the retainer cage in the housing. The length of the rollers with respect to the overall length of the bearing is relatively great, because the length of the lip portions of the housing need only be sufficient to accommodate the rim portions of the cage, and only a slight clearance is required between the ends of the rollers and the shoulders on the housing. The increased effective roll length of the present bearing means that the bearing has a higher theoretical load capacity than previously available bearings of the same overall size.

I claim:

1. A roller bearing assembly including in combination, a thin walled one-piece formed shell having a cylindrical surface providing a raceway lying inwardly from the sides of the shell for receiving rollers, said shell having an integrally formed shoulder at each axial end thereof defining the axial limits of the raceway, with each of said shoulders comprising a radially inwardly directed portion and an axially inwardly directed portion extending from the innermost end of said radially inwardly directed portion, said axially inwardly directed portion being substantially parallel to the axis of the bearing assembly, a plurality of rollers positioned between said shoulders and in rolling relation with said cylindrical surface of said shell, with said rollers having end surfaces engageable with said axially inwardly directed portion such that any substantial axial thrust on a roller during operation of the bearing assembly is borne by said axially inwardly extending portion, a tubular retention cage concentric with said shell member and having a circular rim portion at each side thereof, each said rim portion having an outer circumferential surface adapted to be supported in land riding relationship on said axially inwardly directed portion of a respective one of said shoulders when the bearing assembly is in operation in a mechanism, said cage having horizontally disposed cross bars of uniform cross-section for retaining said rollers, with the side walls of adjacent ones of said cross bars disposed angularly inwardly towards the axial center of the bearing assembly such that the radial outward edges of adjacent ones of said cross bars have a circumferential spacing greater than the diameter of said rollers and the radial inward edges of adjacent ones of said cross bars have a circumferential spacing less than the diameter of said rollers, and a cylindrical annular surface on each of said axially inwardly directed portions of said shoulders extending parallel to the axis of the bearing assembly and confronting the respective rim portion of said cage, said cylindrical annular surfaces on said axially inwardly directed portions being spaced radially from the cylindrical surface of said shell which defines the raceway a distance no greater than the radius of a roller so as to position said cage entirely within the limits defined by said annular surface on said axially inwardly directed portions and the inner periphery of said rollers, thereby maintaining said retention cage in land riding relationship when the bearing assembly is in operation in a mechanism.

2. A drawn shell type roller bearing assembly comprising a tubular retention cage having an annular rim portion on each axial end thereof, a plurality of roller retaining pockets defined by horizontally disposed cross bars of uniform cross-section extending between said rim portions, with the side walls of adjacent ones of said cross bars disposed angularly inwardly towards the axial center of the bearing assembly, with the radial outward edges of adjacent ones of said cross bars having a circumferential spacing greater than the diameter of rollers to be retained by said cage and with the radial inward edges of adjacent ones of said cross bars having a circumferential spacing less than the diameter of rollers to be retained by said cage, an outer race ring comprising a thin walled one-piece formed shell member having a cylindrical surface defining a raceway for receiving rollers, a plurality of rollers positioned inwardly from the sides of said shell member and engageable in rolling relation with said cylindrical surface, and an integral flange structure formed at each axial end of said shell member, with each of said flange structures comprising a radially inwardly directed portion and an axially inwardly directed portion extending from the innermost end of said radially inwardly directed portion, said axially inwardly directed portion being substantially parallel to the bearing assembly axis, said axially inwardly directed portion of each said flange structure having a cylindrical annular surface parallel to the axis of the bearing assembly and spaced from the surface which defines said raceway a distance no greater than the radius of said rollers, with said annular rim portions of said retention cage having an outer circumferential surface adapted to ride on the cylindrical annular surfaces of said axially inwardly directed portions of said flange structure when the bearing assembly is in operating installation.

References Cited by the Examiner

UNITED STATES PATENTS

| | | | |
|---|---|---|---|
| 2,038,475 | 4/1936 | Brown | 308—212 |
| 3,301,399 | 11/1942 | Heim | 308—212 |

References Cited by the Applicant

UNITED STATES PATENTS

| | | |
|---|---|---|
| 2,038,475 | 4/1936 | Brown. |
| 2,301,399 | 11/1942 | Heim. |
| 2,383,727 | 8/1945 | Lewis. |
| 2,567,242 | 9/1951 | Smith. |
| 2,721,775 | 10/1955 | Nusbaum. |
| 2,765,203 | 10/1956 | Barr et al. |
| 2,881,036 | 4/1959 | Neese. |
| 2,884,288 | 4/1959 | Herrmann et al. |
| 2,897,581 | 8/1959 | Cowles et al. |
| 3,014,769 | 12/1961 | Gales. |

DON A. WAITE, *Primary Examiner.*

FRANK SUSKO, *Examiner.*